(12) United States Patent
Feddersen

(10) Patent No.: US 7,102,247 B2
(45) Date of Patent: Sep. 5, 2006

(54) CIRCUIT ARRANGEMENT AND METHODS FOR USE IN A WIND ENERGY INSTALLATION

(75) Inventor: Lorenz Feddersen, Flensburg (DE)

(73) Assignee: Vestas Wind Systems A/S, (DK)

( * ) Notice: Subject to any disclaimer, the term of this patent is extended or adjusted under 35 U.S.C. 154(b) by 60 days.

(21) Appl. No.: 10/502,726

(22) PCT Filed: Jan. 23, 2003

(86) PCT No.: PCT/DE03/00172

§ 371 (c)(1),
(2), (4) Date: Dec. 23, 2004

(87) PCT Pub. No.: WO03/065567

PCT Pub. Date: Aug. 7, 2003

(65) Prior Publication Data

US 2005/0116476 A1 Jun. 2, 2005

(30) Foreign Application Priority Data

Jan. 29, 2002 (DE) ............................. 102 03 468
Feb. 18, 2002 (DE) ............................. 102 06 828

(51) Int. Cl.
H02P 9/48 (2006.01)

(52) U.S. Cl. ..................... 290/44; 290/55; 322/37; 363/21

(58) Field of Classification Search ............. 290/44, 290/55; 322/27, 37; 363/21, 50, 53
See application file for complete search history.

(56) References Cited

U.S. PATENT DOCUMENTS

| 4,812,729 | A | | 3/1989 | Ito et al. |
| 4,891,744 | A | * | 1/1990 | Yamamoto et al. ........... 363/89 |
| 5,278,773 | A | * | 1/1994 | Cousineau ................... 700/287 |
| 5,583,420 | A | * | 12/1996 | Rice et al. ..................... 322/25 |
| 5,650,705 | A | * | 7/1997 | Hart ............................ 318/635 |
| 5,943,223 | A | * | 8/1999 | Pond ............................ 363/53 |
| 6,137,187 | A | * | 10/2000 | Mikhail et al. ............... 290/44 |
| 6,285,533 | B1 | | 9/2001 | Sakamoto |

(Continued)

FOREIGN PATENT DOCUMENTS

DE 197 35 742 2/1999

(Continued)

OTHER PUBLICATIONS

International Search Report; PCT/DE03/00172; May 28, 2003.

Primary Examiner—Nicholas Ponomarenko
(74) Attorney, Agent, or Firm—Cantor Colburn LLP

(57) ABSTRACT

The invention relates to a circuit with a variable rotational speed to be used particularly in a wind power plant, comprising a double fed asynchronous generator (DASM), a crow-bar, an additional resistor (R15) and a converter. In order to meet the requirements of the network provider, whereby a particularly permanent coupling to the network should be ensured so that the wind power plant can start up and stabilize the network during and after medium voltage short circuit in the network, the additional resistor can be regulated with the aid of a fast switch in such a way that the converter can be provisionally disconnected at least partly in case of a short circuit in the network. The rotor current is momentarily assumed by the additional resistor and disconnected after the rotor short circuit current dies out so that the converter can be subsequently connected once again and so that it can supply the desired active short circuit current to the network.

18 Claims, 4 Drawing Sheets

U.S. PATENT DOCUMENTS

| | | | |
|---|---|---|---|
| 6,566,764 B1 * | 5/2003 | Rebsdorf et al. | 290/44 |
| 6,774,608 B1 * | 8/2004 | Hofstetter et al. | 322/24 |
| 6,853,094 B1 * | 2/2005 | Feddersen et al. | 290/44 |
| 6,856,040 B1 * | 2/2005 | Feddersen et al. | 290/44 |
| 6,856,041 B1 * | 2/2005 | Siebenthaler et al. | 290/44 |
| 6,933,625 B1 * | 8/2005 | Feddersen et al. | 290/44 |
| 7,015,595 B1 * | 3/2006 | Feddersen et al. | 290/44 |

FOREIGN PATENT DOCUMENTS

| | | |
|---|---|---|
| EP | 0 309 814 | 4/1989 |
| JP | 07 067393 | 3/1995 |
| JP | 07 194196 | 7/1995 |
| JP | 2001 268992 | 9/2001 |

* cited by examiner

CIRCUIT ARRANGEMENT AND METHODS FOR USE IN A WIND ENERGY INSTALLATION

BACKGROUND OF THE INVENTION

The invention relates to circuit arrangement which is intended in particular for use in a variable rotation speed wind energy installation, comprising a double-fed asynchronous generator, an additional resistor and a converter; and methods hereof.

Circuit arrangements such as these which are intended for use in variable speed wind energy installations are widely used in practice and are thus prior art by virtue of obvious prior use. However, it has been found to be disadvantageous when using double-fed asynchronous machines (DASM) that these are disconnected from the network in the event of a network short circuit at the medium-voltage level. This means that it is not possible to achieve the desired network stabilization by means of a wind power installation which is operated with a double-fed asynchronous machine.

In the past, the necessary network stabilization has thus been achieved by the network operators by means of conventional power stations. Owing to the rapidly increasing number of wind power installations and the rapidly rising power level associated with them, which has now reached the magnitude of conventional power stations, the requirements for wind power installations must, however, be matched to those of conventional power stations. In particular, permanent network coupling is being increasingly demanded in order that the wind energy installation can set up the network again, and can stabilize it, once a medium-voltage network short circuit has ended.

SUMMARY OF THE INVENTION

The invention provides a circuit arrangement for use in wind power installations having an asynchronous machine, by means of which more stringent requirements for modern wind power installations, in particular with regard to network stabilization, can be satisfied.

According to the invention, this is achieved by circuit arrangements and methods according to the features of the independent patent claims. The dependent claims relate to particularly expedient embodiments of the invention.

Thus, according to the invention, a circuit arrangement is proposed in which the additional resistor can be controlled by means of a high-speed switch such that the converter can be at least temporarily switched off in the event of a network short circuit, in order for the rotor current to be taken over in the short term by means of the additional resistor, and can be connected to the network again for active injection of a short-circuit current after the rotor short-circuit current has decayed.

This allows the more stringent network requirements for network stabilization during operation of the wind power installation equipped with an asynchronous generator to be optimally satisfied, because no disconnection from the network takes place in this case in the event of a network short circuit at the medium-voltage level. For this purpose, for example, an additional resistor which is in the form of a controllable load resistor or a crow bar which is equipped with the additional resistor for this purpose was inserted in the rotor circuit to draw the rotor short circuit energy when a network short circuit occurs, and which is then switched off once the short-circuit current has decayed. The load resistor is controlled by a switch which, in particular, can be actively switched off and is, in particular, not a naturally commutated thyristor. The existing rotor inverter for the four-quadrant inverter is briefly deactivated immediately after the occurrence of the network short circuit and is activated again after the short-circuit equalization process has decayed, with the threshold value advantageously being below the rotor inverter rated current, and then feeds the necessary power into the network during the network short circuit and when the network voltage returns.

A modification of the present invention has been found to be particularly advantageous in this case, in which the circuit arrangement has two or more resistors which can be connected dependent on one another or independently of one another. This means that the high rotor short-circuit current, which is frequently more than 1000 A, can be shared between a number of switches, since these switches which can be switched off would have to be connected in parallel in a highly complex manner for the total current.

A circuit arrangement having a two-point regulator for control of the additional resistor is also particularly advantageous since this allows very simple, high-speed and robust control to be set up.

In this case, a further modification has been found to be particularly expedient in which the active switch is controlled by pulse-width modulation at a fixed clock frequency, because this allows digital control at a fixed clock frequency.

Furthermore, it also promises to be particularly successful for the active switch to be controlled by a P regulator, a PI regulator or a PID regulator. This means that the rotor short-circuit current or the rotor terminal voltage can be optimally regulated when a network short circuit takes place.

A refinement of the circuit arrangement according to the invention is also particularly advantageous in which in the event of a network short circuit, a capacitive current or an inductive current is supplied to the short circuit, since this allows the network to be stabilized in an optimum manner depending on the network operator requirement. A capacitive current is normally desirable in order to supply the inductive network loads.

It is also particularly worthwhile to prevent any wattless component from being transmitted into the short circuit when a network short circuit occurs since this results in the least current being fed into the short circuit, in order to avoid overloading existing medium-voltage switches.

Furthermore, according to a further particularly advantageous refinement, an additional impedance is briefly inserted in the stator circuit in order to limit the stator and the rotor current. The insertion of the additional impedance as required allows the stator current and rotor current to be limited when the network voltage returns.

An embodiment is also particularly advantageous in which a high-seed contactor is inserted in the stator circuit in parallel with the additional impedance, in order in this way to bridge the additional impedance during normal operation, and to avoid producing losses.

Furthermore, it also promises to be particularly successful for at least one thyristor with natural commutation to be inserted in the stator circuit in parallel with the resistor. Compared with switches which can be switched off actively, this results in reduced losses during normal operation, with the costs being lower.

Furthermore, the circuit arrangement can be designed in a particularly advantageous manner by operating a controlled resistor on the intermediate circuit of the converter, because this makes it possible to save some of the components in the crow bar, and the control for the rotor inverter measures the rotor phase current all the time.

Another particularly expedient refinement of the invention is also achieved by operating a controlled resistor both in the crow bar and in the intermediate circuit of the converter. This allows power sharing, and smaller individual switches can be used. Towards the end of the equalization process for the rotor short-circuit current, all of the rotor current is carried, and the rotor inverter control then measures the entire phase current.

Furthermore, a particularly advantageous embodiment of the invention is also achieved by switching off the rotor inverter when the network voltage returns, with the overcurrent then being carried by the controllable resistor, in order to actively carry the rotor current once the overcurrent has decayed and the controlled resistor has been switched off. This avoids the wind energy installation from possibly being switched off and disconnected from the network, in particular when the network voltage returns suddenly.

BRIEF DESCRIPTION OF THE DRAWINGS

The invention allows various embodiments. One of these is illustrated in the drawing, and will be described in the following text, in order to further explain the fundamental principle of the invention. In the figures.

DETAILED DESCRIPTION OF THE INVENTION

Figure 1:
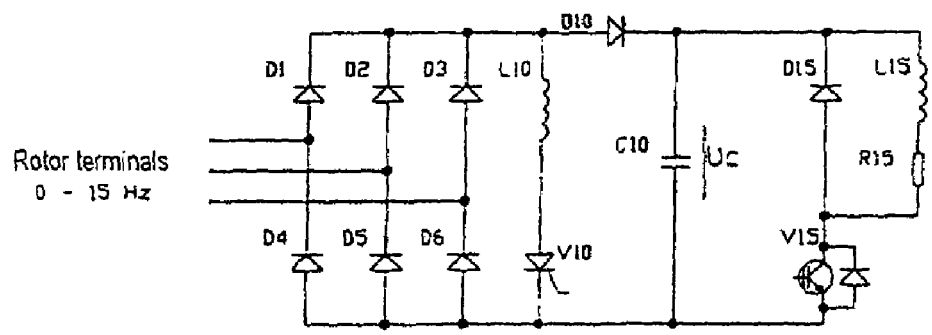
FIG. 1 shows a circuit arrangement according to the invention.

FIG. 1 shows a circuit arrangement according to the invention. During normal operation, a switch V15, for example an IGBT, GTO, IGCT, is switched off and the crow bar is fully inactive. All of the rotor current flows into a converter and is regulated by it. If a network short circuit occurs at the medium voltage, the full excitation of an asynchronous generator means that it will supply an equalization short-circuit current to the short circuit. The current is limited only by the stray inductances of the asynchronous generator and medium-voltage transformer, and the maximum current reaching the following value:

$$I_{stator} \approx 1.8 \cdot \frac{U_{network}}{Xtr + X1 + X2'}$$

In this case, Xtr is the total stray impedance of the transformer, X1 is the stray impedance of the stator and X2' is the stray impedance of the rotor. In the event of a short circuit on the medium voltage, the maximum stray current is in practice in the order of magnitude of up to 8 times the stator rated current. The rotor current is coupled by transformer action to the stator current and also reaches up to 8 times the rotor rated current. This high equalization current cannot technically sensibly be carried or absorbed by the converter. When the short circuit occurs, a rotor inverter is switched off due to the overcurrent. The rotor current continues to flow via freewheeling diodes in the rotor inverter, and charges an intermediate circuit C3. At the same time, the voltage across a capacitor C10 in the crow bar rises. When the voltage across the capacitor C10 reaches a limit value, the switch V15 is switched on. A resistor R15 carries all of the rectified rotor current, and the voltage across the capacitor C10 falls below the voltage limit value, so that the switch V15 is switched off. The voltage across the capacitor C10 then rises again owing to the rotor current, and the switch V15 is switched on again. The rate of current change and hence also the clock frequency are governed by L15. The clock frequency is up to the kHz range and cannot be produced by natural commutation of thyristors, since the maximum rotor frequency is 15 Hz. This two-point regulation results in a constant back e.m.f. for the rotor voltage, and the equalization current decays in a very short time because of the high constant back e.m.f. All of the current is commutated from the rotor inverter to the crow bar. The converter current is virtually zero. The crow bar current is measured and evaluated by the control board. The load resistance is designed for maximum current, and the time for which the switch V15 is switched on is initially close to 100%. As the equalization current falls, the time for which the switch V15 is switched on becomes less and is approximately 12% at the rotor rated current, which corresponds to approximately ⅛ of the maximum current. It would also be feasible to use two or more resistors, which can be connected and disconnected individually. When the equalization current falls below the rotor rated current, then the switch V15 is switched off completely, and the rotor current commutates back into the converter. The converter starts to operate and provide regulation, and actively feeds the short circuit. While the controllable resistor is active, the network inverter can be switched off, although simultaneous operation is also possible. For safety reasons, a thyristor V10 is provided in the crow bar, which automatically measures the voltage and is triggered in the event of failure in the switch V15 or in the event of a direct generator short circuit. L10 prevents the current from rising excessively fast, in order to prevent destruction of the thyristor V10. In this case, D10 prevents rapid discharging of a capacitor C10 through the switch V15. The switch V15 can be controlled either directly in the crow bar or by the control board for the converter.

Figure 2:
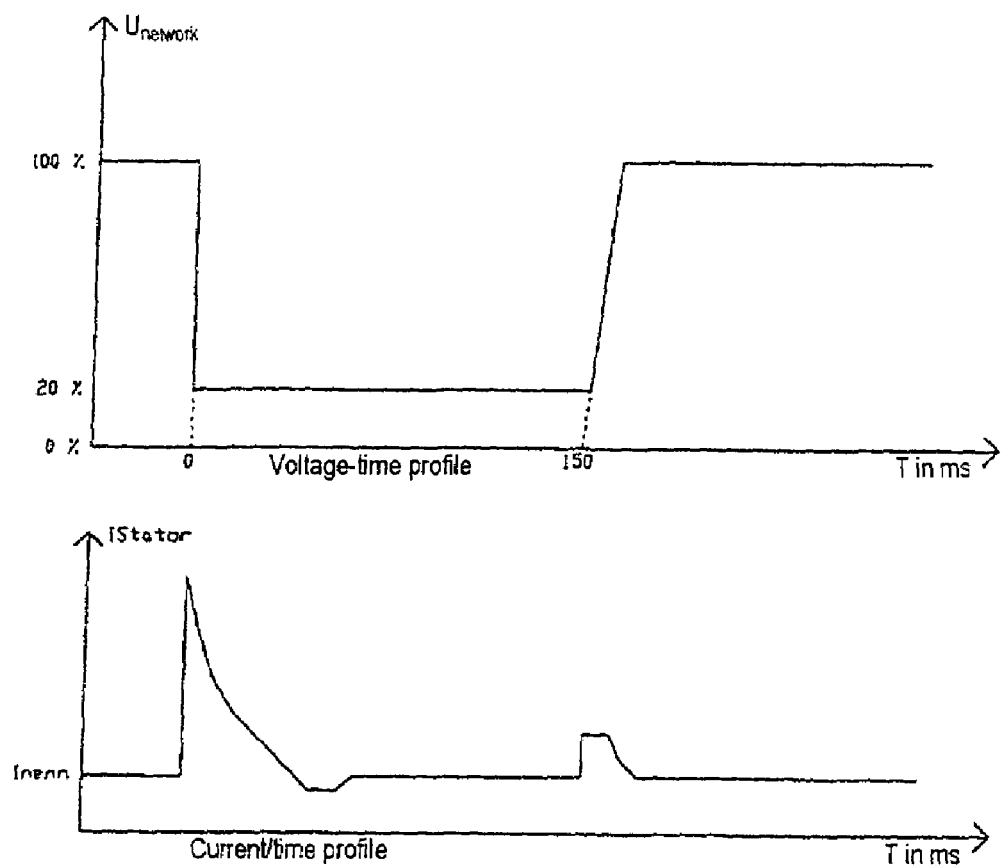
FIG. 2 shows one possible short-circuit profile.

FIG. 2 illustrates one possible short-circuit profile, with the dashed line representing the medium voltage and the solid line representing the network voltage. The short circuit occurs at the instant 0 ms. The current immediately jumps to the maximum value and then decays, as a result of the equalization process. The high current is drawn by the crow bar and resistor. When the current falls below the rotor rated current, it is once again transferred to and controlled by the converter. The generator is overexcited and supplies a capacitive wattless component to the network during the network short circuit. However, inductive current can also be fed into the short circuit. This can be preset freely as required. Owing to the voltage drop across the medium-voltage transformer, the network voltage is in the order to magnitude of about 20% of the rated voltage. At the instant when the voltage returns, the voltage does not rise suddenly to the rated value, but rises over a dU/dt flank. A dynamic overcurrent occurs in the stator and rotor as a result of the flank gradient of the returning network voltage and the time constant of the generator. It must be possible for this overcurrent to be supplied by the converter without this leading to the rotor inverter being switched off. If the flank gradient is too great or there is a phase fault between the generator voltage and the returning network voltage, then the dynamic overcurrent or equalization current will be excessively high, and the rotor inverter is switched off. In this case as well, the controllable resistor briefly carries the equalization current and, once the current has fallen below the rotor rated current, the resistor is switched off and the rotor inverter is once again regulated. The controllable resistor is briefly activated during the drop in voltage and when the voltage returns. The rotor inverter is switched off during this time.

Figure 3:
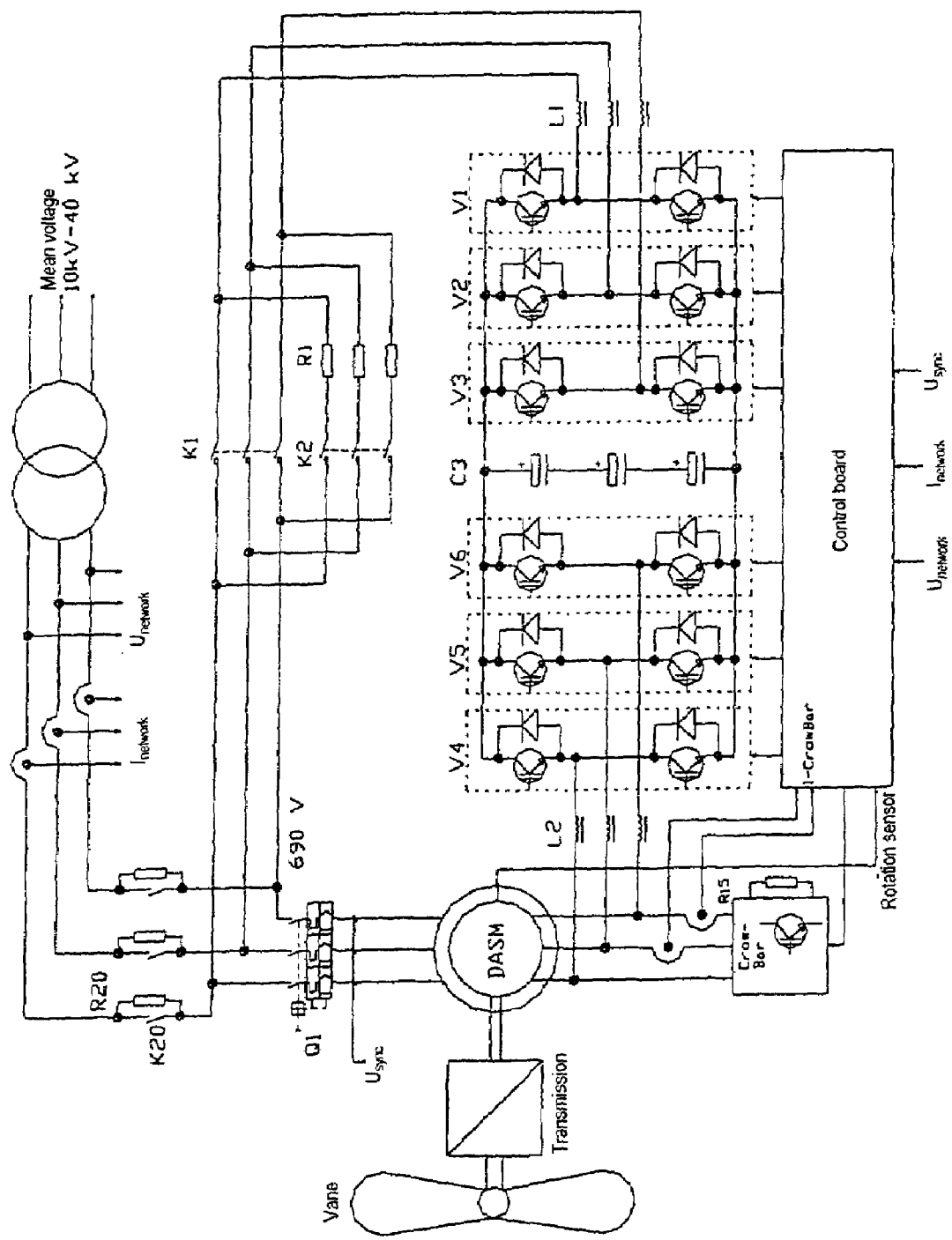
FIG. 3 shows a circuit arrangement with a controllable rotor resistance and an additional stator resistance.

In the event of extremely fast voltage rise times, an additional impedance, for example in the form of a resistor or an inductor, can be inserted in the stator circuit. A system such as this is illustrated in FIG. 3. A contactor K20 is inserted between the medium-voltage transformer and the generator/converter system. A resistor R20 is connected in parallel via the contactor K20. If a short circuit occurs, then the contactor K20 is opened and the stator current flows through the resistor R20.

Figure 4:
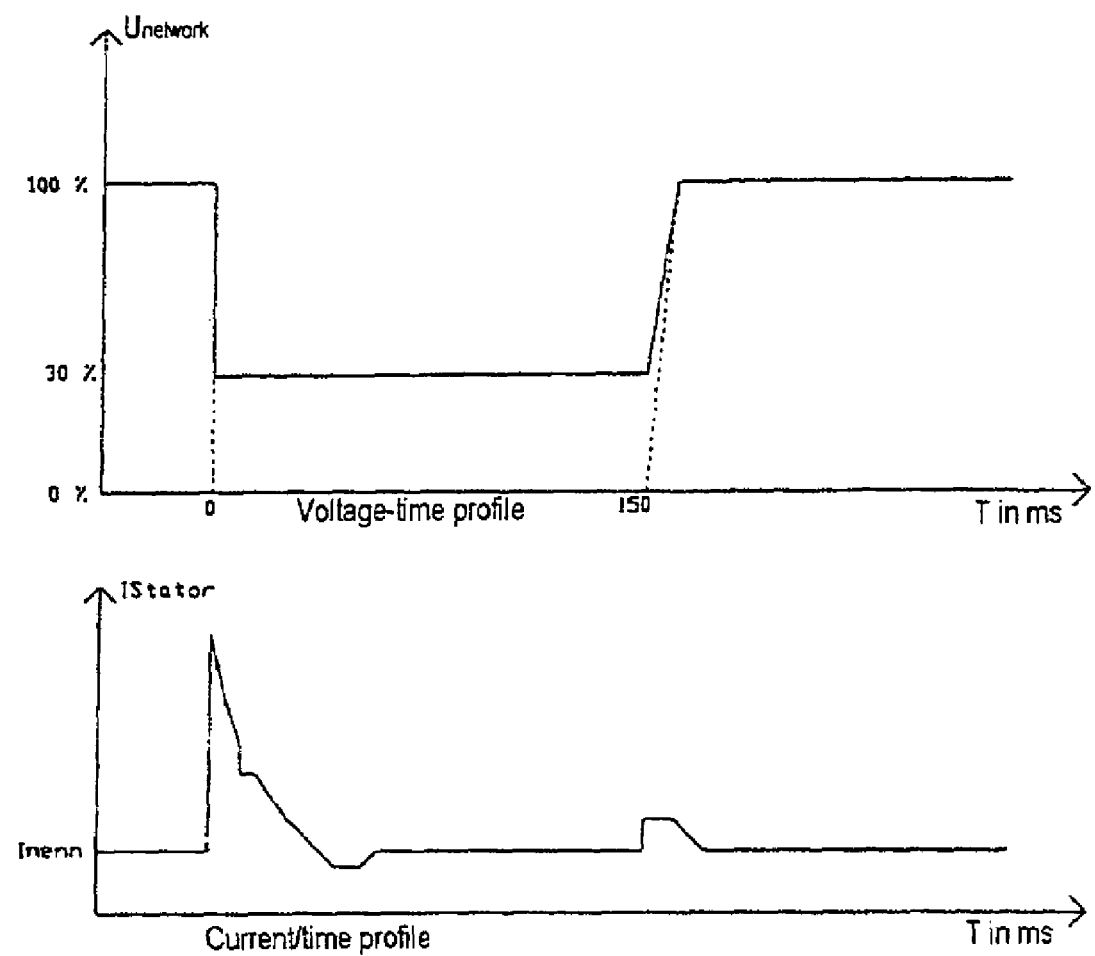
FIG. 4 shows a voltage- and current-time profile with an additional resistor.

FIG. 4 shows the voltage-time profile with an additional resistor. The stator current is limited and decays more rapidly than with only the regulated crow bar. The contactor has to switch very quickly for the resistor to be active in the event of very short voltage drops. A back-to-back parallel-connected thyristor switch with natural commutation may also be used with, for example, a switching off time of 6.7 ms at 50 Hz. This results in a high-speed switch, that has the disadvantage of high losses, compared with the contactor solution. In FIG. 4, the switch is opened after 10 ms. The converter once again provides the control function after the equalization process. Owing to the additional voltage drop across the resistor, the residual network voltage is higher than that without any additional impedance in the stator. When the voltage returns, the additional resistor limits the dynamic stator current rise, thus allowing higher voltage flanks and lower overcurrents.

Figure 5:
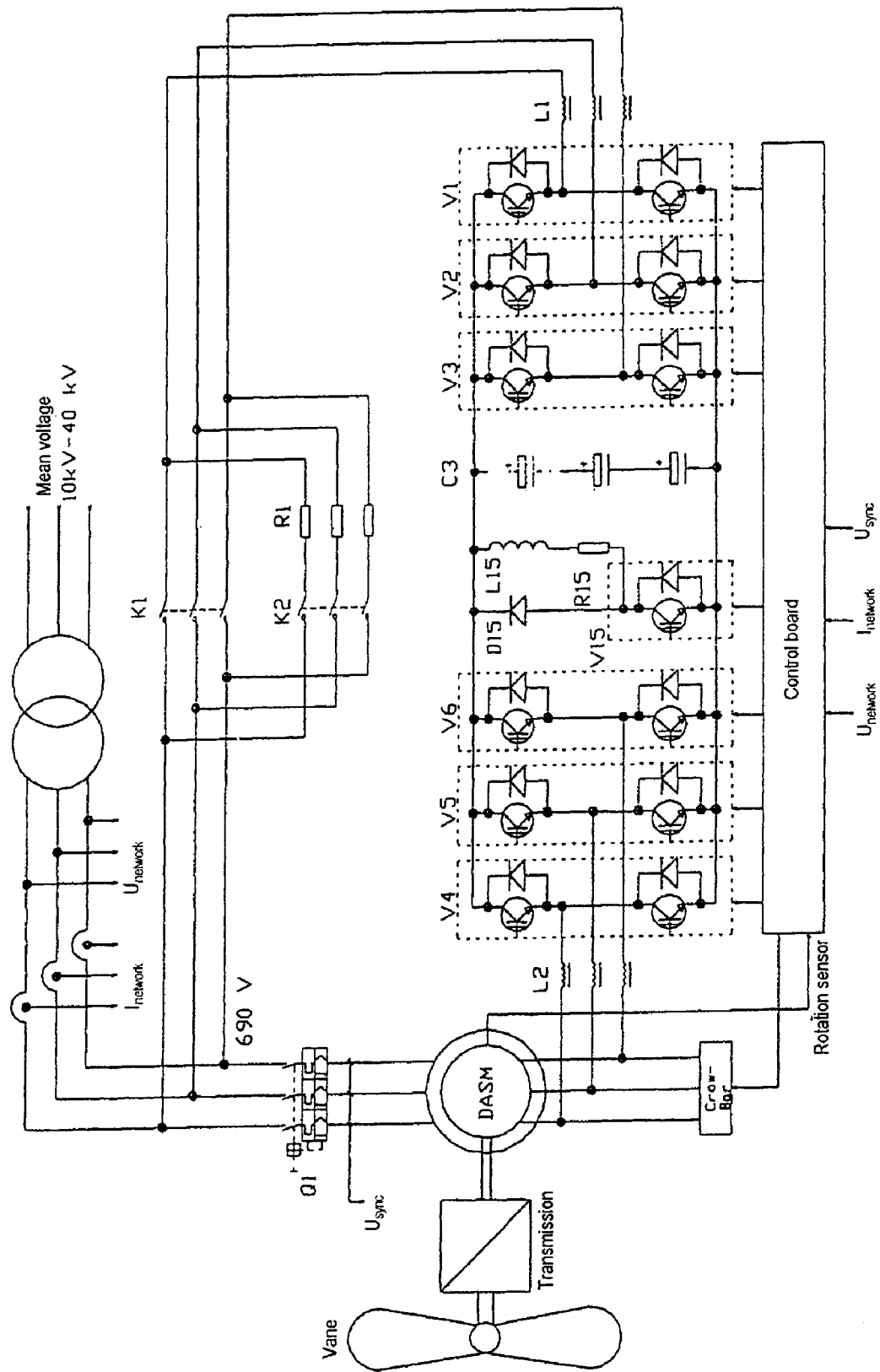
FIG. 5 shows a circuit arrangement with stronger inverter diodes and a controllable load resistance in the intermediate circuit.

The freewheeling diodes of IGBT modules are not designed for very high pulse currents. The components of the controlled resistor were therefore placed in the crow bar. FIG. 5 shows a circuit arrangement with high-power freewheeling diodes. The switch V15 is coupled directly to the intermediate circuit of the converter, and directly regulates the intermediate voltage. This would simplify the entire design. The additional standard crow bar is retained for extreme situations.

It would also be possible to completely dispense with the crow bar. In this case, the additional resistor must be designed for all extreme situations. In the event of a short circuit, the rotor inverter IGBTs are switched off, and the rotor short-circuit current flows through the freewheeling diodes into the intermediate circuit. If a limit value is exceeded, the additional resistor is activated, and the short-circuit energy is absorbed in the additional resistor. Once the short-circuit current has decayed, the rotor inverter is activated once again, and the additional resistor is switched off. It is also possible to switch the additional resistor off first of all, and to connect the rotor inverter. Simultaneous operation of the additional resistor and of the rotor inverter is also possible.

The invention claimed is:

1. Circuit arrangement which is intended in particular for use in a variable rotation speed wind energy installation, comprising a double-fed asynchronous generator, an additional resistor and a converter, characterized in that the additional resistor can be controlled by means of a switch such that the converter can be at least temporarily disconnected in the event of a network short circuit, in order for the rotor current to be taken over in the short term by means of the additional resistor, and can be connected to the network again for active injection of a short-circuit current after the rotor short-circuit current has decayed.

2. Circuit arrangement according to claim 1, characterized in that the converter can be connected below a rotor inverter rated current once the rotor short-circuit current has decayed.

3. Circuit arrangement according to claim 1, characterized in that the circuit arrangement has two or more resistors which can be connected dependent on one another or independently of one another.

4. Circuit arrangement according to claim 1, characterized by a two-point regulator for controlling the additional resistor.

5. Circuit arrangement according to claim 1, characterized in that the switch is controlled by pulse-width modulation at a fixed clock frequency.

6. Circuit arrangement according to claim 1, characterized in that the switch is controlled by a P regulator, a PI regulator or a PID regulator.

7. Circuit arrangement according to claim 1, characterized in that the additional resistor is a component of a crow bar.

8. Circuit arrangement according to claim 7, characterized in that the active switch is controlled directly by the crow bar.

9. Circuit arrangement according to claim 8, characterized in that the crow bar switch is controlled directly by the converter control board.

10. Circuit arrangement according to claim 1, characterized in that, in the event of a network short circuit, a capacitive current or an inductive current is supplied to the short circuit.

11. Circuit arrangement according to claim 1, characterized in that, in the event of a network short circuit, no wattless component is transmitted to the short circuit.

12. Circuit arrangement according to claim 1, characterized in that an additional impedance is briefly inserted in the stator circuit in order to limit the stator and rotor current.

13. Circuit arrangement according to claim 12, characterized in that a high-speed contactor is inserted in the stator circuit in parallel with the resistor.

14. Circuit arrangement according to claim 12, characterized in that at least one thyristor with natural commutation is inserted in the stator circuit in parallel with the resistor.

15. Circuit arrangement according to claim 1, characterized in that a regulated resistor is operated on the intermediate circuit of the converter.

16. Circuit arrangement according to claim 7, characterized in that a regulated resistor is operated both in the crow bar and in the intermediate circuit of the converter.

17. Circuit arrangement according to claim 1, characterized in that, when the network voltage returns, the rotor inverter is switched off, and the overcurrent is passed through the controllable resistor and, once the overcurrent has decayed, the controlled resistor is disconnected and the rotor inverter actively carries the rotor current.

18. Circuit arrangement for use in a variable rotation speed wind energy installation comprising a double-fed asynchronous generator, an additional resistor and a converter, wherein the rotor inverter is switched off when the network voltage rises, and the overcurrent is passed through the controllable resistor and, once the overcurrent has decayed, the controlled resistor is switched off and the rotor inverter actively carries the rotor current.

* * * * *